United States Patent [19]
Gilles, Jr. et al.

[11] Patent Number: 5,683,219
[45] Date of Patent: Nov. 4, 1997

[54] MECHANICAL TRUCK RESTRAINT

[75] Inventors: John M. Gilles, Jr., Spring Hill; Michael M. Riddle, Summertown, both of Tenn.

[73] Assignee: Pioneer Manufacturing, Inc., Spring Hill, Tenn.

[21] Appl. No.: 660,372

[22] Filed: Jun. 7, 1996

[51] Int. Cl.⁶ .................................................. B65G 67/02
[52] U.S. Cl. ........................ 414/401; 414/396; 414/584
[58] Field of Search .................................. 414/396, 401, 414/584; 340/686, 687; 14/69.5, 71.1

[56] References Cited

U.S. PATENT DOCUMENTS

| | | | |
|---|---|---|---|
| Re. 32,968 | 6/1989 | Hahn et al. | 414/401 |
| Re. 33,154 | 1/1990 | Hahn et al. | 414/401 |
| 4,373,847 | 2/1983 | Hipp et al. | 414/401 |
| 4,400,127 | 8/1983 | Metz | 414/401 |
| 4,443,150 | 4/1984 | Hahn et al. | 414/401 |
| 4,472,099 | 9/1984 | Hahn et al. | 414/401 |
| 4,488,325 | 12/1984 | Bennett et al. | 14/71.3 |
| 4,553,895 | 11/1985 | Ellis | 414/401 |
| 4,555,211 | 11/1985 | Metz | 414/401 |
| 4,560,315 | 12/1985 | Hahn | 414/401 |
| 4,589,813 | 5/1986 | Hagen et al. | 414/401 |
| 4,605,353 | 8/1986 | Hahn et al. | 414/301 |
| 4,630,989 | 12/1986 | Davey | 414/401 |
| 4,634,334 | 1/1987 | Hahn et al. | 414/401 |
| 4,664,582 | 5/1987 | Edmands | 414/401 |
| 4,695,216 | 9/1987 | Erlandson | 414/401 |
| 4,728,242 | 3/1988 | Erlandsson | 414/402 |
| 4,735,542 | 4/1988 | Fisher et al. | 414/401 |
| 4,759,678 | 7/1988 | Hageman | 414/401 |
| 4,767,254 | 8/1988 | Kovach et al. | 414/401 |
| 4,815,918 | 3/1989 | Bennett et al. | 414/401 |
| 4,818,170 | 4/1989 | Fisher et al. | 414/401 |
| 4,830,563 | 5/1989 | Yeakle | 414/401 |
| 4,861,217 | 8/1989 | Erlandsson | 414/401 |
| 4,915,568 | 4/1990 | West | 414/401 |
| 4,938,647 | 7/1990 | Erlandsson | 414/401 |
| 4,963,068 | 10/1990 | Gelder | 414/401 |
| 4,964,777 | 10/1990 | Kleynjans et al. | 414/401 |
| 4,973,213 | 11/1990 | Erlandsson | 414/401 |
| 5,026,242 | 6/1991 | Alexander | 414/401 |
| 5,071,306 | 12/1991 | Alexander | 414/401 |
| 5,096,359 | 3/1992 | Alexander | 414/401 |
| 5,120,181 | 6/1992 | Alexander | 414/401 |
| 5,203,663 | 4/1993 | Ruppe | 414/401 |
| 5,212,846 | 5/1993 | Hahn | 14/69.5 |
| 5,259,718 | 11/1993 | Alexander | 414/401 |
| 5,336,033 | 8/1994 | Alexander | 414/401 |
| 5,346,353 | 9/1994 | Alexander | 414/401 |
| 5,375,965 | 12/1994 | Springer et al. | 414/786 |
| 5,388,947 | 2/1995 | Ancel et al. | 414/401 |

*Primary Examiner*—Frank E. Werner
*Attorney, Agent, or Firm*—Waddey & Patterson; I. C. Waddey, Jr.

[57] ABSTRACT

A mechanical track restraint that can be mounted to a loading dock without any modification whatsoever to the loading dock or to the concrete pad that is poured in front of the loading dock on which a truck sits during the loading process. The mechanical track restraint can be bolted onto the dock, can be removed and replaced with another device, moved to another location easily and quickly, and can be installed and/or repaired quickly. The device includes a base having a pipe and angle irons welded to the pipe to hold the pipe in place. Fitted within the pipe is a dowel and a spring that coils about the dowel. Fitted over the dowel and spring combination is a holding tube which telescopes within the pipe. The pipe has a slot cut in the front of it so that a hook which is hingedly connected to the holding tube can extend out from the pipe and travel in an up and down direction to raise and lower the hook. Sleeves are welded to the holding tube and the hook includes pivot arms extending into the sleeves. Thus, the hook can be raised and lowered in response to the pressure of the spring unless the hook is pressed down and rotated into an "at rest" position. When the hook is rotated into an at rest position, it is clipped beneath a lock arm in an out of the way position to prevent injury to the device and to others passing near the device. An engagement tool is provided so that the hook can be pressed down against the pressure of the spring to release it from the locking arm, rotated into an active position and released so that the pressure of the spring will cause it to rise and engage the ICC bar on the rear of a track backed up to the dock.

10 Claims, 3 Drawing Sheets

MECHANICAL TRUCK RESTRAINT

BACKGROUND OF THE INVENTION

Our invention relates generally to a mechanical truck restraint and more particularly to a truck to dock locking device which is manually operated and designed to engage the standard ICC bar on the back of a truck to lock the truck in a fixed position relative to a loading dock or the like.

At all loading docks, there is an eminent danger of trucks leaving the loading dock while a loading/unloading operation is still in process. The movement of the truck can be intentional, for example, where the driver thinks the loading/unloading process is completed, and thus starts to drive away from the dock without first determining if in fact such process is completed, or the movement of the truck may be inadvertent such as might occur upon the failure of brakes or movement of wedges that have been set to prevent movement of the truck. Movement of a truck while the loading/unloading of the cargo bay is still in process creates a real and present danger for personnel using lift trucks to transport cargo into our out of the cargo bay since an unannounced departure of the truck from the loading dock could cause a lift truck to fall from the loading dock or into the back of the truck. A similar problem exists with respect to trailers which are parked at a loading dock without a tractor. The shock and vibration transmitted to a trailer during the loading/unloading operations can cause the trailer to drift away from the dock or even cause the landing gear to collapse and drop the trailer forward in the driveway away from the loading dock.

Such accidents occur with sufficient frequency that many attempts have been made to secure a truck to a loading dock during the loading/unloading operations. Alternatively, a variety of systems of signal lights and alert mechanisms have been created to notify dock personnel as well as drivers as to the status of the loading/unloading operations. The most common method of preventing such accidents is to manually place rubber or metal wheel chocks in front of the truck wheels when the truck is parked at the loading platform. The second most popular method of dealing with the problem is the use of a mechanical structure for engaging the standard ICC bar on the rear of the truck to lock the truck in place. There have been many efforts to develop a mechanical locking device that will prevent a truck from movement relative to the dock. Most of these devices are effective. The problem with them is that in practically every design, there are unnecessary complexities which increase the cost of manufacture of the locking device. The primary problem with the prior art devices are that they are too complex. They require motors, pneumatic activating systems, electric eyes, digging holes in the docking area in order to bury the locking system, electrical power to run motors that cause the locking devices to engage, they have multiple moving parts that are subject to wear and tear, they are expensive to manufacture, difficult to maintain, difficult to install, and problematic to replace. What is missing from the prior art is a locking device that is simple to operate, simple and inexpensive to manufacture, is fail safe and fool-proof, can be easily installed, can be readily repaired, can be moved between an active/inactive position in order to avoid damage to the locking device when it is not in use and to prevent the locking device from being an obstacle to personnel working around the loading dock when the device is not in use. Applicants' invention accomplishes all of these objectives.

SUMMARY OF THE INVENTION

Our invention is a mechanical truck restraint that can be mounted to a loading dock without any modification whatsoever to the loading dock or to the concrete pad that is poured in front of the loading dock on which a truck sits during the loading process. The mechanical truck restraint can be bolted onto the dock, can be removed and replaced with another device, moved to another location easily and quickly, and can be installed and/or repaired quickly. The device includes a base having a pipe and angle irons welded to the pipe to hold the pipe in place. Fitted within the pipe is a dowel and a spring that coils about the dowel. Fitted over the dowel and spring combination is a holding tube which telescopes within the pipe. The pipe has a slot cut in the front of it so that a hook which is hingedly connected to the holding robe can extend out from the pipe and travel in an up and down direction to raise and lower the hook. Sleeves are welded to the holding tube and the hook includes pivot arms extending into the sleeves. Thus, the hook can be raised and lowered and will be raised in response to the pressure of the spring unless the hook is pressed down and rotated into and out of an "at rest" position. When the hook is rotated into an at rest position, it is clipped beneath a lock arm in an out of the way position to prevent injury to the device and to others passing near the device. An engagement tool is provided so that the hook can be pressed down against the pressure of the spring to release it from the locking arm, rotated into an active position and released so that the pressure of the spring will cause it to rise and engage the ICC bar on the rear of a truck backed up to the dock.

DESCRIPTION OF THE PREFERRED EMBODIMENT

Figure 1:
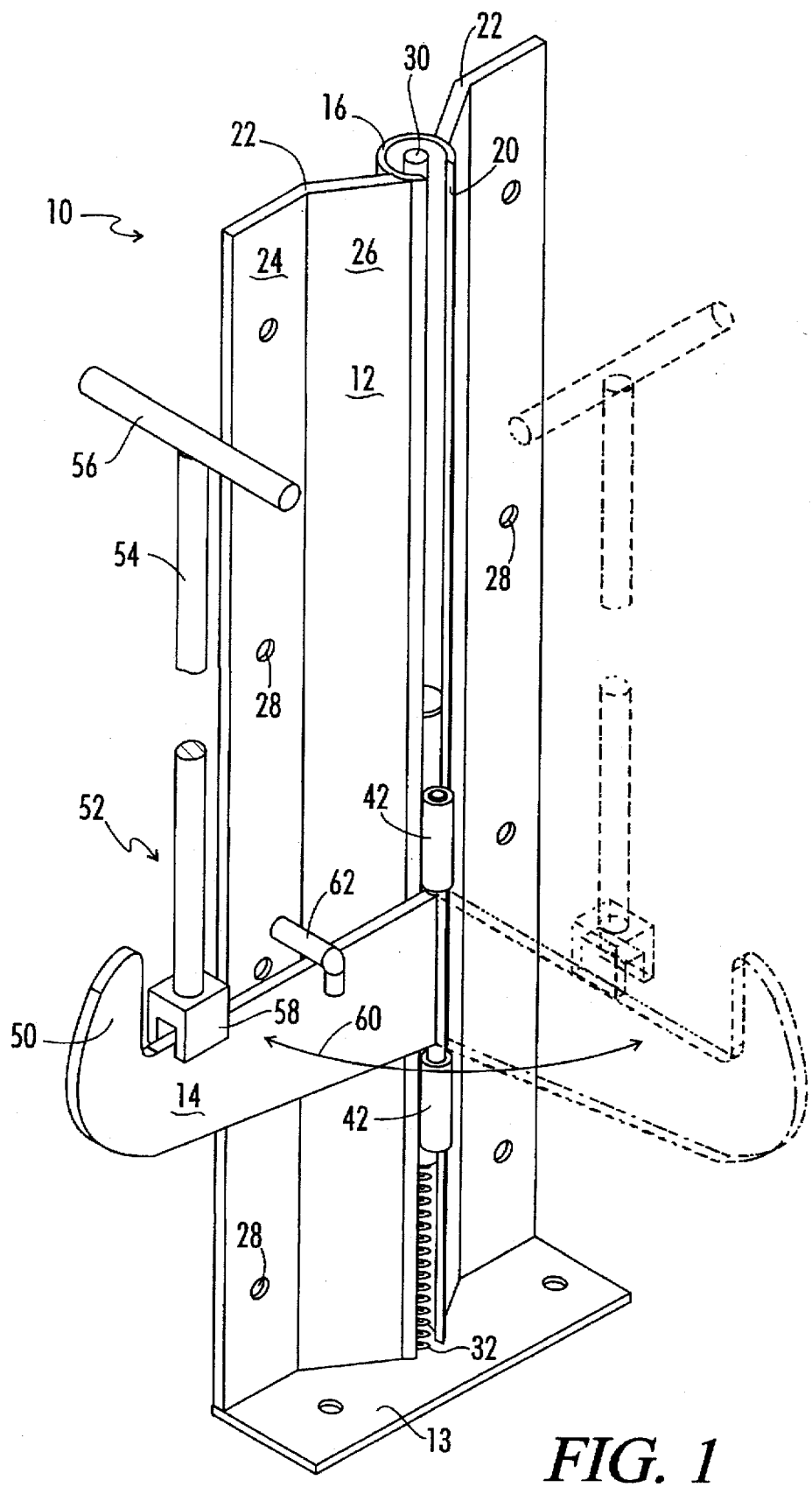
FIG. 1 is a perspective view showing the device of the present invention with the hook shown in the "at rest" position and shown alternatively in phantom lines in the active position.
Figure 2:
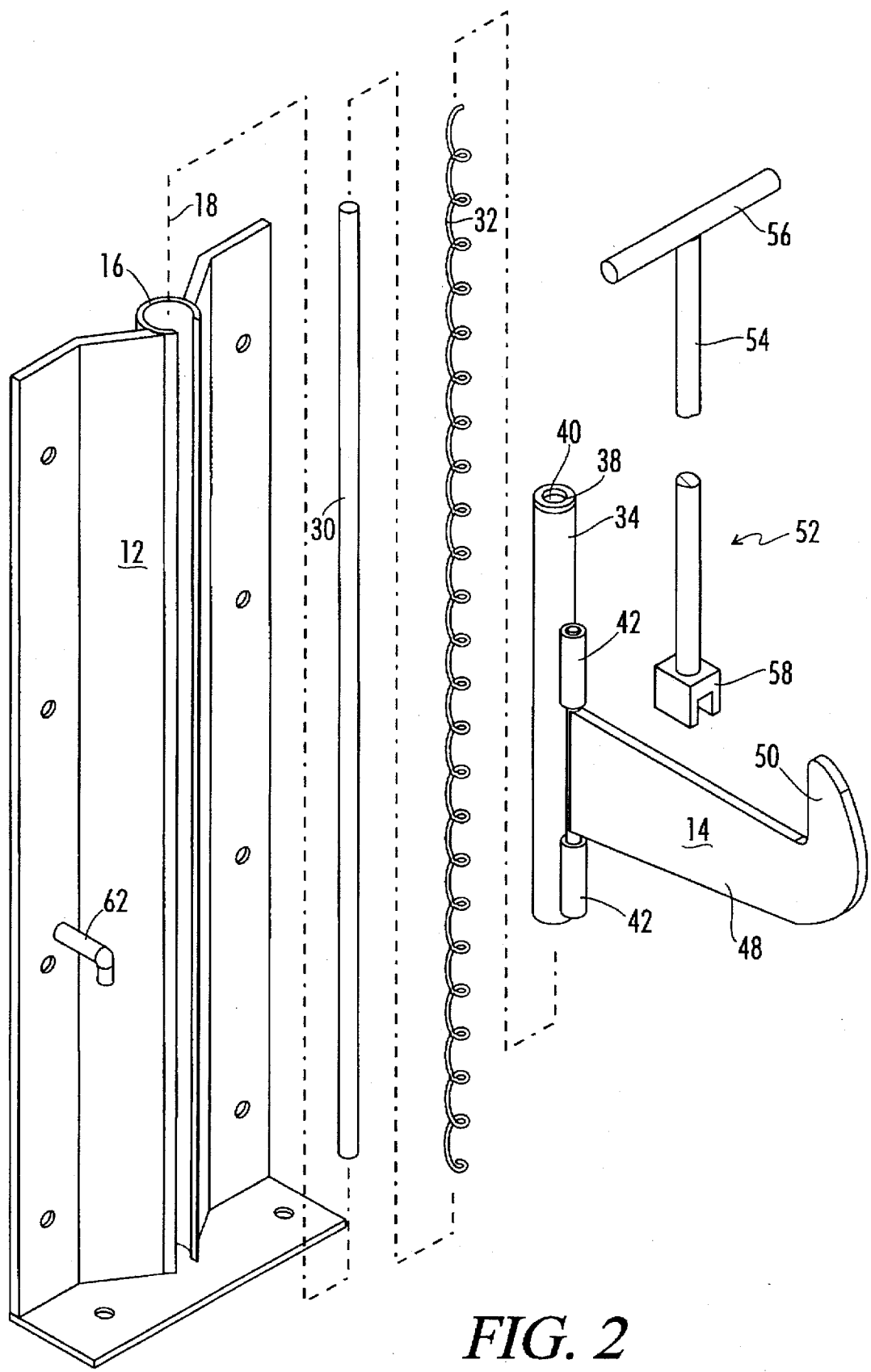
FIG. 2 is an exploded view in perspective of the device.

Applicants' invention will be best understood when consideration is given to the preferred embodiment of the invention as illustrated in the drawings, including FIGS. 1-4, wherein like reference numerals refer to like parts.

Referring now to the Figures, Applicants' mechanical mack restraint 10 is illustrated generally in perspective in FIG. 1. The mack restraint 10 includes a base 12 which when mounted, will extend longitudinally in a vertical or upright fashion. The base 12 has a pad 13 at the bottom so that the base can sit on a support surface and be bolted to the support surface if necessary. The mechanical mack restraint 10 includes a hook 14 for engaging the ICC bar on the rear of a mack when the mack is backed up to the loading dock.

The base 12 includes a pipe 16 extending longitudinally and having an axis 18. The pipe has a slot 20 along the length thereof running parallel to the axis 18. Angle irons 22 are provided on either side of the pipe 16. Each angle irons 22 includes an elongated foot 24 and an elongated leg 26 welded to each other at an angle. Each elongated leg 26 is welded to opposing sides of the pipe 16 and provides a fixed relationship between the angle irons 22 and the pipe 16. The offset created by the angle of connection between the elongated foot 24 and the elongated leg 26 of each angle iron allows the flat side of the foot 24 to fit flat against the face of the loading dock. Mounting holes 28 are provided in each foot 24 and in the base 13 so that the device 10 can be mounted to a loading dock by screws passing through the holes 28 and into the face of the loading dock. Screws or bolts either can be used to connect the device to the loading dock by passing the shank of the screw or bolt through holes 28 into engagement with the dock (not shown).

The device includes a dowel 30 which also has an axis coinciding with the axis 18 of the pipe 16 and the dowel 30 fits within the pipe 16 with the pipe 16 fitting concentrically about the perimeter of the dowel 30. Encircling the dowel 30 is an expansion spring 32 and the dowel serves to hold the spring in position and keep it from crimping or binding.

Holding tube 34 fits over the dowel and spring and the dowel and spring telescope within the channel 36 extending axially through the holding tube 34. The holding tube 34 has a cap 38 on its top and a hole or guide 40 is provided in the cap 38. Thus, the dowel 30 can pass through the dowel guide 40 allowing the holding tube 34 to slide up and down the dowel 30 within the center channel of the pipe 16, all in a telescoping movement that is unrestrained yet held securely in place.

Welded at 44 to the holding tube 34 are a pair of sleeves 42 and the sleeves extend through the slots 20 of the pipe 16. The sleeves 42 are spaced apart and designed to mate with and receive the pivot arms 46 which are provided on the base of the hook 14. The pivot arms 46 project upwardly from the top of the hook and downwardly from the bottom of the hook into the openings within the sleeves 42. Thus, the hook 14 can be rotated about the pivot point created by the engagement of the pivot arms 46 within the sleeves 42.

The hook 14 includes an extension arm 48, which causes the hook to protrude radially outwardly from the pivot point created by the pivot arms 46 extending within the sleeves 42, and terminates in a finger 50. The finger 50 is turned upwardly when the system is properly mounted on a cargo dock so as to engage the ICC bar on the rear of a track and lock the track in a fixed position relative to the loading dock once the system is in place.

Figure 4:
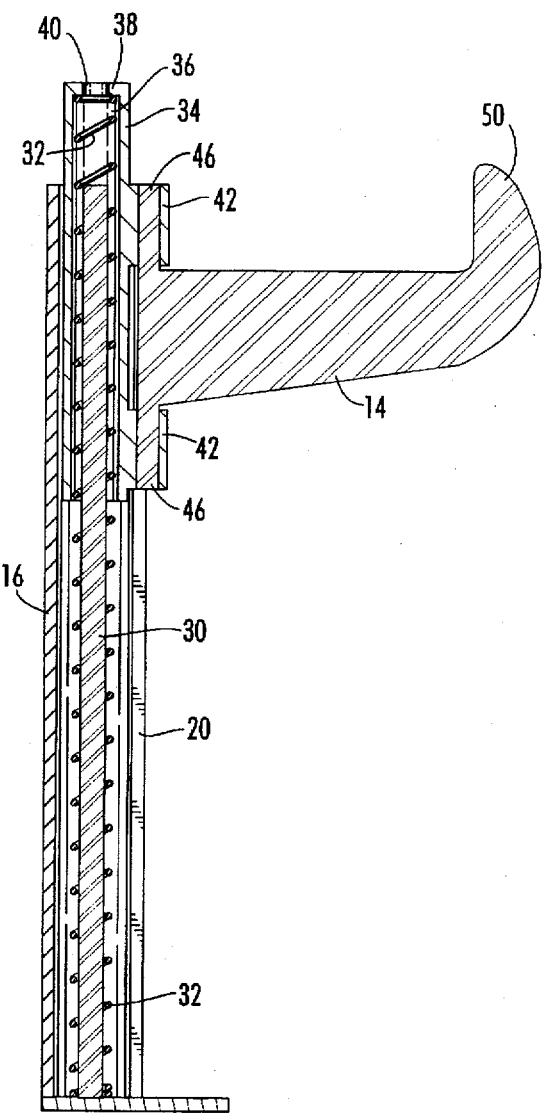
FIG. 4 is a cross sectional view of the device showing it in an active position.

A tool 52 is provided to move the mechanical truck restraint 10 between an at rest position as shown in full lines in FIG. 1 and an active position as shown in dotted lines in FIG. 1 and as is shown in FIG. 4. The tool 52 includes a rod 54 having a handle 56 at one end and a fork 58 at the other.

In operation, the mechanical track restraint 10 is mounted to a loading dock in the vertical orientation shown in FIG. 1 by passing screws or bolts (not shown) through the holes 28 and securing the device to the loading dock. Screws or bolts can also be passed through the holes in the pad 13 to secure the device to the support structure below the loading dock.

Figure 3:
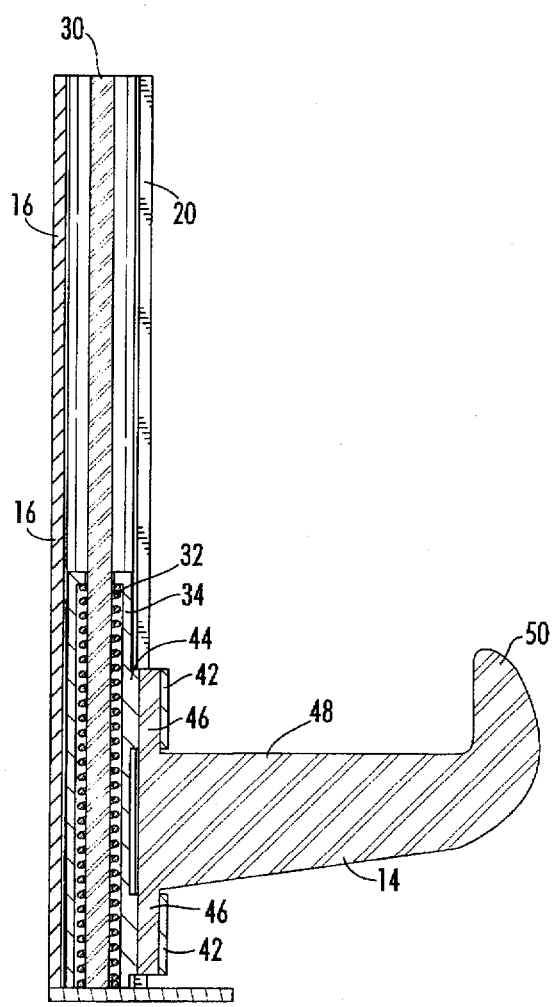
FIG. 3 is a cross sectional view of the device showing it in the "at rest" position.

When the device 10 is not in use, the tool 52 will be used to swing the hook 14 in the direction of the arrow 60 by engaging the fork 58 over the upper edge of the extension arm 48, pressing downwardly on the handle to cause the tool 52 to press the hook 14 down to the position shown in FIG. 3 against the pressure of the spring 32. The tool 52 is then rotated in the direction of the arrow 60 to swing the hook 14 beneath the lock arm 62 provided on either side of the device.

When a truck backs up the loading dock and it is desired to lock the truck to the loading dock, a worker can simply take the tool 52 and position it downwardly between the dock and the back of the cargo bed of the truck to engage the extension arm 48 in the fork 58 of the tool. The worker then presses down on the handle 56 of the tool 52 causing the hook to move downwardly and clear the lock arm 62. At that point, the hook 14 is swung outwardly into the position shown in phantom lines in FIG. 1 to extend radially outwardly from the device. The hook 14 now clears the lock arm 62 and the pressure of the expansion spring 32 will cause the hook to move upwardly to the position shown in FIG. 4 as pressure is relieved from the hook 14 by the worker releasing pressure on the handle 56 of the tool. At this point, the finger 50 of the hook 14 will engage the ICC bar on the rear of the truck and lock the track in fixed position against the dock.

When it is time for the track to leave the docking location, the worker simply reverses the process, using the tool 52 to press downwardly on the hook 14 until it clears the ICC bar and is in the position shown in FIG. 3. At that point, the hook is swung in the direction of the arrow 60 to extend beneath the lock arm 62 and place the hook in the at rest position as shown in full lines in FIG. 1.

Although there have been described particular embodiments of the present invention of a new and useful mechanical track restraint, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What we claim is:

1. A mechanical track restraint device for locking a truck having an ICC bar to a loading dock, said device including a base and a hook, said base including a pipe having an axis with said axis aligned substantially vertically when said device is mounted on a dock, means for connecting said base to a dock, said pipe having an elongated slot extending substantially the length of the pipe, said slot being substantially parallel to said axis, a dowel inside said pipe, a coil spring fitted about said dowel, a holding tube fitted over said dowel and said coil spring and telescopically mounted inside said pipe, said hook having opposing ends, one end of said hook pivotally connected to said holding tube and the other end of said hook having a finger to latch onto the ICC bar of a truck when the device is in the activated position.

2. The device of claim 1 further including a locking arm for holding said hook in an at rest position when said hook is rotated about its pivotal connection to said holding tube to a retracted position.

3. The device of claim 1 wherein said hook is pivotally connected to said holding tube by means including sleeves attached to said holding arm and pivot arms at said one end of said hook with said pivot arms extending into said sleeves and combining with them to form a hinged connection between said hook and said base.

4. The device of claim 1 wherein said finger is pointing upwardly.

5. The device of claim 1 further including an elongated tool for moving said hook between an at rest position and an active position, said tool including an elongated rod having a handle on one end and a fork on an opposite end.

6. The device of claim 1 wherein said means for attaching said pipe to a loading dock includes angle irons welded to said pipe.

7. The device of claim 6 wherein said angle irons include an elongated foot connected at an angle to an elongated leg with the angle of connection between said foot and said leg causing an offset mounting of said pipe, whereby said base can be mounted flat against a loading dock.

8. The device of claim 1 further including a cap on said holding tube with said dowel passing through said cap.

9. The device of claim 1 further including a dowel guide in said holding tube.

10. The device of claim 1 wherein said base includes a foot aligned to be connected to the surface immediately in front of a loading dock where the device is to be mounted.

* * * * *

UNITED STATES PATENT AND TRADEMARK OFFICE
CERTIFICATE OF CORRECTION

PATENT NO : 5,683,219
DATED : November 4, 1997
INVENTOR(S): Gilles, et al.

It is certified that error appears in the above-identified patent and that said Letters Patent is hereby corrected as shown below:

On the title page, item [57],

In the Abstract, line 1, change "track" to --truck--.
In the Abstract, line 5, change "track" to --truck--.
In the Abstract, line 28, change "track" to --truck--.

In the Background, column 1, line 5 of the Patent, change "track" to --truck--.

column 1, line 7 of the Patent, change both occurrences of "track" to --truck--.

column 1, line 11 of the Patent, change "track" to --truck--.

column 1, line 18 of the Patent, change both occurrences of "track" to --truck--.

column 1, line 22 of the Patent, change "track" to --truck--.

column 1, line 23 of the Patent, change "track" to --truck--.

column 1, line 24 of the Patent, change "track" to --truck--.

column 1, line 43 of the Patent, change "track" to --truck--.

column 2, line 1 of the Patent, change "track" to --truck--.

column 2, line 2 of the Patent, change "track" to --truck--.

column 2, line 26 of the Patent, change "track" to --truck--.

UNITED STATES PATENT AND TRADEMARK OFFICE
CERTIFICATE OF CORRECTION

PATENT NO : 5,683,219
DATED : November 4, 1997
INVENTOR(S): Gilles, et al.

It is certified that error appears in the above-identified patent and that said Letters Patent is hereby corrected as shown below:

column 2, line 45 of the Patent, change "mack" to --truck--.

column 2, line 46 of the Patent, change "mack" to --truck--.

column 2, line 50 of the Patent, change "mack" to --truck--.

column 2, line 52 of the Patent, change both occurrences of "mack" to --truck--.

column 3, line 32 of the Patent, change "track" to --truck--.

column 3, line 33 of the Patent, change "track" to --truck--.

column 3, line 40 of the Patent, change "track" to --truck--.

column 4, line 3 of the Patent, change "track" to --truck--.

column 4, line 5 of the Patent, change "track" to --truck--.

column 4, line 14 of the Patent, change "track" to --truck--.

Signed and Sealed this

Seventeenth Day of February, 1998

*Attest:*

*Attesting Officer*

BRUCE LEHMAN

*Commissioner of Patents and Trademarks*